United States Patent [19]
Midden

[11] Patent Number: 5,172,868
[45] Date of Patent: Dec. 22, 1992

[54] HOME COFFEE GRINDER

[75] Inventor: William E. Midden, Springfield, Ill.

[73] Assignee: Bunn-O-Matic Corporation, Springfield, Ill.

[21] Appl. No.: 781,862

[22] Filed: Oct. 24, 1991

[51] Int. Cl.$^5$ .......................... B02C 7/08; B02C 23/02
[52] U.S. Cl. .................................... 241/246; 241/100; 241/248; 241/261.2
[58] Field of Search ............ 241/100, 246, 248, 261.2, 241/261.3

[56] References Cited

U.S. PATENT DOCUMENTS

| | | | |
|---|---|---|---|
| 199,877 | 1/1878 | Sulouff | 241/246 |
| 2,549,275 | 4/1951 | Wood | 241/246 |
| 3,610,540 | 10/1971 | Kropp et al. | 241/2 |
| 3,957,214 | 5/1976 | Berggren | 241/246 |
| 4,187,992 | 2/1980 | Del Valle | 241/248 X |
| 4,821,966 | 4/1989 | Ephraim et al. | 241/261.2 X |
| 4,967,649 | 11/1990 | Ephraim et al. | 241/261.2 X |
| 5,058,814 | 10/1991 | Ephraine et al. | 241/261.2 X |

Primary Examiner—Douglas D. Watts
Assistant Examiner—Eugenia A. Jones
Attorney, Agent, or Firm—Trexler, Bushnell, Giangiorgi & Blackstone, Ltd.

[57] ABSTRACT

A material flow inducing device for use in a material grinding apparatus. The grinding apparatus includes a grinding mechanism for grinding material, a motor for driving the grinding mechanism, and a hopper portion for holding a quantity of material for grinding in the grinding mechanism during a grinding operation. The flow inducing device includes a stirring member having extending arms which curve in a direction complimentary to a direction of rotation of the stirring member. The arms of the stirring member are compressibly flexible. Also included in the flow-inducing portion is an auger positioned between the stirring member and the grinding mechanism. Both the stirring member and the auger are operatively associated with the motor such that the stirring and auger rotate during a grinding operation. A material metering portion is positioned in the grinding apparatus in a surrounding relation to the auger member and has multiple downwardly spiraling inwardly sloping troughs formed in a top surface. The troughs facilitate movement of the material into the grinding mechanism.

17 Claims, 3 Drawing Sheets

HOME COFFEE GRINDER

BACKGROUND OF THE INVENTION

This application is directed to improvements in material grinders.

Generally speaking, coffee grinders for home must be relatively simple and reliable, and yet durable and reasonably maintenance free. These goals must be accomplished within strict budgetary considerations, making it possible to design, assemble and market a coffee grinder at a price suitable for the consumer products market.

Coffee popularity has been increasing during recent years and, as a result of this popularity, many consumers now demand fresh ground coffee for their home coffee brewing machines. For the distinguishing palate, the whole bean coffee provides a more flavorful brewed coffee than commercially available pre-ground coffee. Additionally, coffee drinkers who prefer to mix their own blend of coffee beans find it necessary to have a coffee grinder at home. As an additional factor, whole bean coffee retains its flavor and freshness much longer than pre-ground coffee and as such is the choice of discriminating coffee drinkers.

The grinding of coffee requires a grinding apparatus which has sufficient power to fully grind the coffee to a desired size, but yet does not bruise, burn, or abrade the coffee beans during the grinding operation. Under ideal conditions, coffee beans should pass through the grinder path only once to avoid excessive grinding into undesirably small particles as well as burning or abrading against the other particles or against the grinding components. More specifically, when coffee beans are ground they should pass through the grinder relatively quickly and be ground to a desired uniform finished particulate size. Unfortunately, many currently available coffee grinding machines do not satisfy these ideal conditions.

It has been found that many consumer devices encounter a degree of difficulty in grinding beans which have an oily or sticky coating. While some types of coffee beans tend toward a dry outer surface, a number of darker roasts have an oily or sticky coating. The oily or sticky coating can result from the roasting process in which oils evolve from the inside of the coffee beans to the surface as commonly found in expresso roast, French roast and most commonly in Italian roast coffee. Additionally, beans also may be sticky or oily as a result of a flavoring process or as preservative measure using a light non-flavored oil to lock in the aroma and flavor of a particular coffee bean after roasting.

When the "sticky beans" are placed in a coffee grinder, they have a tendency to stick to surfaces in the hopper and grinder thereby preventing complete grinding of the coffee disposed in the coffee hopper. For example, sticky beans cause a problem when they become stuck in the hopper and require manual vibration or moving in order to cause the beans to flow into the grinding portion of the apparatus. Additionally, sticky beans may stick to the surfaces inside the grinding portion and can block the flow into the grinding portion.

OBJECTS AND SUMMARY OF THE INVENTION

A general object of the present invention is to provide a flow inducing device for use with a material grinding apparatus to promote the flow of material through the grinding apparatus during a grinding operation.

Another object of the present invention is to provide a grinding apparatus which moves material, even if the material has a sticky surface, through the grinding mechanism to prevent the accumulation of the unground material in the apparatus.

Yet another object of the present invention is to provide a grinding apparatus which actively moves material there through and passes the material though the grinding mechanism in a single pass during a grinding operation.

Briefly, and in accordance with the foregoing, the present invention comprises material flow inducing means for use with a material grinding apparatus. The grinding apparatus includes a grinding mechanism for grinding material, a motor for driving the grinding mechanism, and a hopper portion for holding a quantity of material for grinding in the grinding mechanism during a grinding operation. The flow inducing means include a stirring member having extending arms which curve in a direction complimentary to a direction of rotation of the stirring member. The arms of the stirring member are compressibly flexible. Also included in the flow-inducing portion is an auger positioned between the stirring member and the grinding mechanism. Both the stirring member and the auger are operatively associated with the motor such that the stirring member and auger rotate during the grinding operation. A material metering portion is positioned in the grinding apparatus in a surrounding relation to the auger member and has multiple downwardly spiraling inwardly sloping troughs formed in a top surface thereof. The troughs facilitate movement of the material into the grinding mechanism.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE ILLUSTRATED EMBODIMENT

While the invention may be susceptible to embodiment in different forms, there is shown in the drawings, and will be described in detail, a specific embodiment with the understanding that the present disclosure is to be considered an exemplification of the principles of the invention and is not intended to limit the invention to that as illustrated and described herein.

Figure 1:
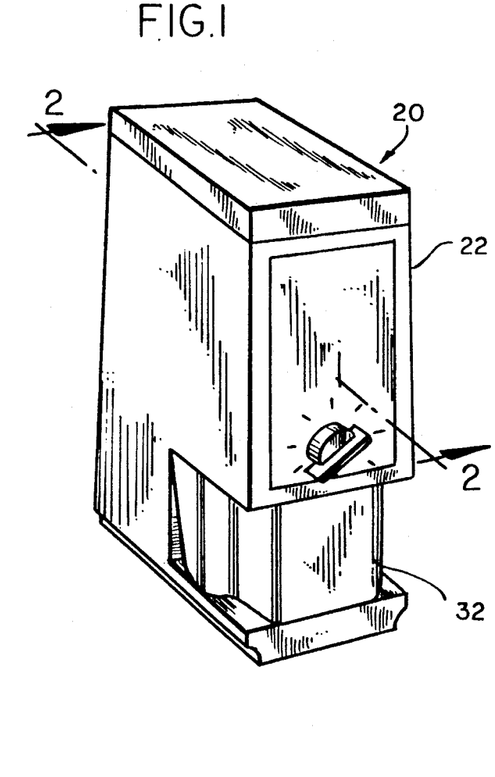
FIG. 1 is a perspective view of a grinding apparatus of the present invention.
Figure 2:
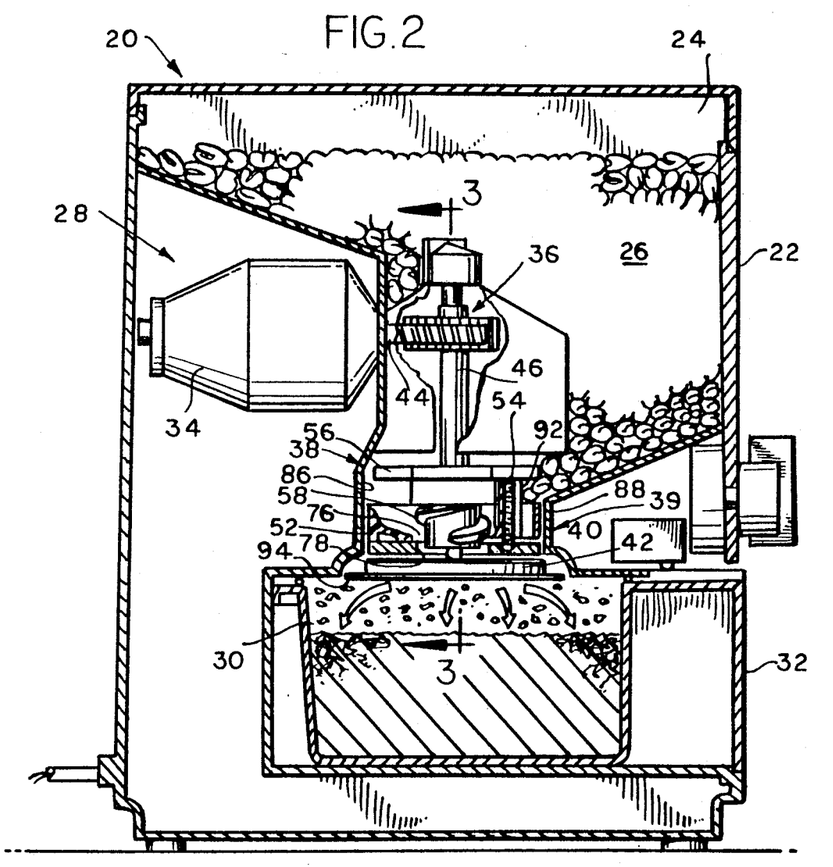
FIG. 2 is a partial fragmentary cross sectional view of the grinding apparatus taken along line 2—2 in FIG. 1.

Referring now to the drawings, wherein like parts are designated by similar reference numerals throughout the figures, a grinding apparatus 20 is shown in FIG. 1. The grinding apparatus 20 includes a case or housing generally indicated by the reference numeral 22 within which is defined a bin or hopper 24 for holding a supply of material 26 to be ground. As shown in FIG. 2, a grinding assembly, designated generally by reference numeral number 28, receives coffee beans 26 from the hopper 24, grinds the beans to a desired size, and delivers the ground coffee 30 to a collection receptacle 32.

Figure 3:
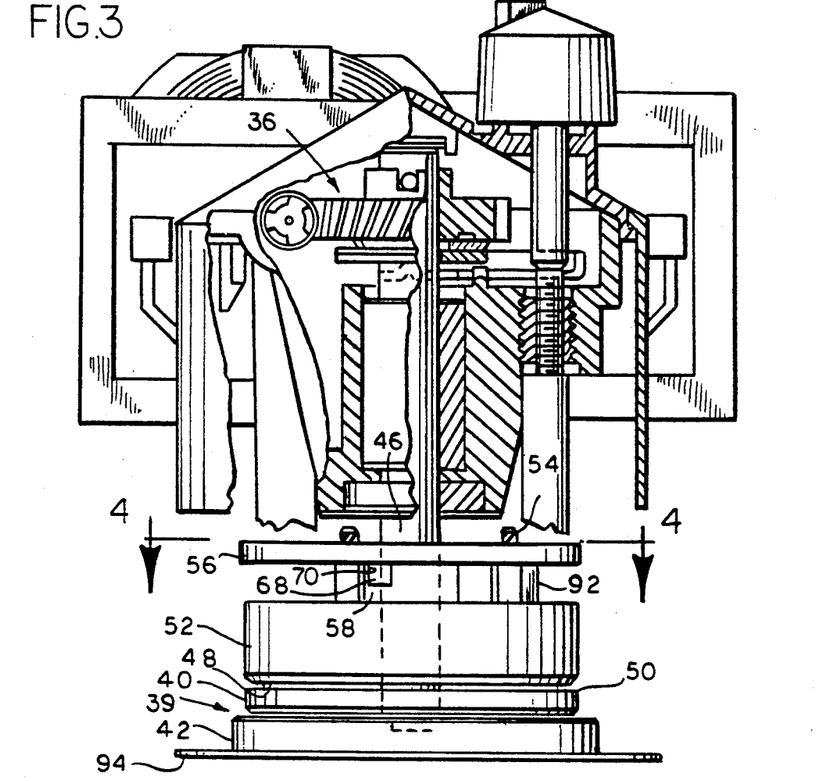
FIG. 3 is a partial fragmentary cross sectional view of the grinding apparatus taken along line 3—3 in FIG. 2.

With reference to FIGS. 2 and 3, the grinding assembly 28 includes drive means 34, represented a a motor, for driving a gear arrangement 36 which in turn operates material flow inducing means 38 and a grinding mechanism 39 represented in the illustrated embodiment as a pair of grinding burrs 40,42. The driving forces created by the motor 34 are transferred from a motor axle 44 to a grinding mechanism drive shaft 46 by means of the gear arrangement 36. One of the burrs is a rotary burr 42 which is attached to the drive shaft 46 and rotates when operated by the motor 34. Likewise, the material flow inducing means 38 is attached to the drive shaft 46 to produce rotary movement upon operation of the motor 34.

Grinding is affected between opposed faces 48,50 of the stationary burr 40 and the rotary burr 42, respectively. Each of the opposed faces 48,50 have grinding surfaces formed thereon. The stationary burr 40 is attached in a stationary manner to a material metering portion 52. Fasteners 54 attach the stationary burr 40 and the material metering portion 52 to the grinding assembly 28.

As best shown in FIGS. 4–8, the material flow inducing means 38 includes a stirring member 56 and an auger member 58. Both the stirring member 56 and the auger 58 are attached to the drive shaft 46 so that rotary motion of the drive shaft 46 is imparted to the stirring member 56 and the auger 58 when the drive shaft 46 is rotated. A stirring member bore 60 and an auger bore 61 extend generally coaxially through the stirring member 56 and the auger 58, respectively. The drive shaft 46 extends coaxially through the bores 60,61 and a mounting pin 62 extends through a side bore 64 to fix the auger 58 to the drive shaft 46. The side bore extends generally perpendicularly through the auger 58 relative to a central axis 66 extending generally coaxially through the drive shaft 46 and the bores 60,61.

Figure 7:
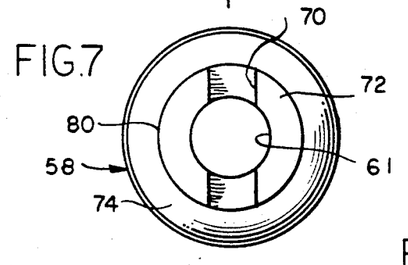
FIG. 7 is a top plan view of an auger member of the material flow inducing device as illustrated in FIG. 5 showing a keyway in a top portion thereof.
Figure 8:
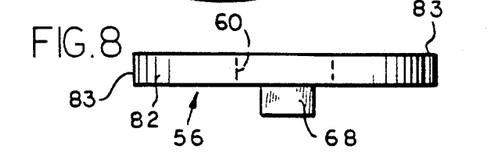
FIG. 8 is a side elevational view of a stirring member of the flow inducing device as illustrated in FIG. 5 showing a key portion which matably engages the keyway on the auger portion.
Figure 9:
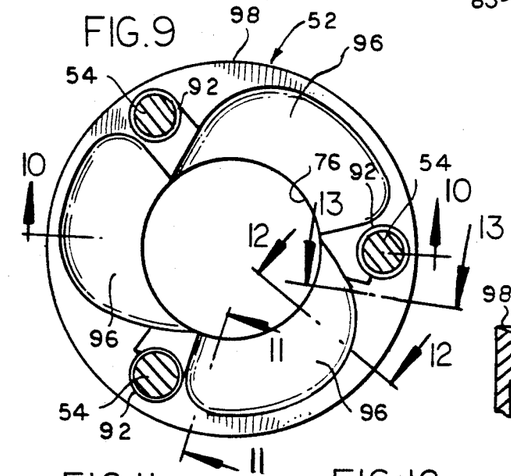
FIG. 9 is a top plan view of a metering member of the present invention.

While the mounting pin 62 extending through the bore 64 attaches the auger 58 to the drive shaft 46, the stirring member 56 attaches to the auger 58 by means of a key 68 engaged with a keyway 70. The keyway 70 is formed in a top surface 72 of the auger 58. The key 68 is formed extending downwardly from the stirring member 56 to cooperatively engage the keyway 70 formed in the auger 58. An adhesive or an an ultra sonic weld joint may be added between the keys 68 and the corresponding keyways 70 to securely attach the stirring member to the auger 58.

Figure 5:
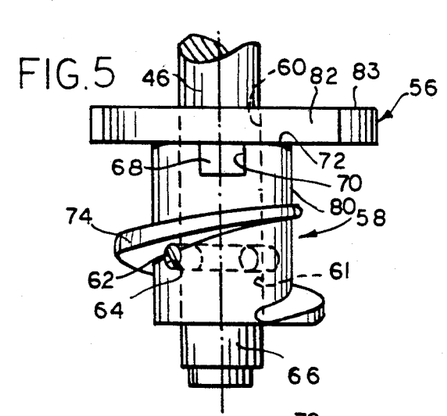
FIG. 5 is a partial fragmentary side elevational view of a material flow inducing device of the present invention attached to a drive shaft.

While the flow inducing means 38 as shown in FIG. 5 is a two-piece member, the flow inducing means 38 may be integrally formed as a unitary single-piece body of common material thus eliminating the need for the keyway 70 and the key 68. However, the stirring member 56 and auger 58 are less difficult to mold from a plastic material and the corresponding molds are less complex if these pieces 56,58 are formed as individual pieces.

A preferred material which is used for forming the stirring member 56 is a nylon type material. The nylon material provides suitable strength and flexibility characteristics as well as friction reduction and wear resistance. It is important to consider a material which has a suitable degree of wear resistance as each extending arm 82 functions to contact each of the mounting posts 92 each time it rotates. For the same reasons, the flexibility characteristics of the material are also an important consideration. A particular type of nylon, commonly known as Nylon 66 ®, has been found to be a suitable material for this application. Nylon 66 ® is produced by DuPont Corporation.

With reference to FIG. 5 as well as FIGS. 2 and 3, the auger 58 is formed with a single twist helical screw thread 74 having a wide spacing between portions of the thread 74. A multiple twist thread may be used instead of the single twist thread 74 as illustrated. Rotation of the auger 58 during a grinding operation rotates the screw thread 74 to pull beans 26 being gravity fed from the hopper 24 down into the metering portion 52 and into the burrs 40,42.

As best shown in FIGS. 2 and 3, the auger 58 is positioned inside of an aperture 76 formed through the metering portion 52 coaxial with the drive shaft 46. A similarly positioned aperture 78 is formed through the stationary burr 40. The clearance between a root surface 80 of the auger 58 and the inside diameters of the apertures 76,78 is sufficient to permit coffee beans to move therethrough.

Figure 6:
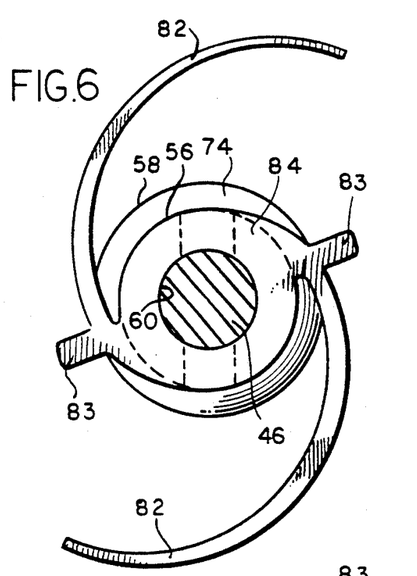
FIG. 6 is a top plan view of the material flow inducing device as illustrated in FIG. 5.

As most clearly shown in FIG. 6, the stirring member 56 is formed with extending arms 82 and sweeper arms 83. The extending arms 82 generally spirally extend away from the central bore 60. The sweeper arms 83 are shorter and are positioned over the metering portion aperture 76 for further promoting the distribution and sweeping of beans into metering portion 52. Both the extending arms 82 and the sweeper arms 83 are formed integral with a hub portion 84 on which the key 68 is formed.

As shown in FIG. 2, the stirring member 56 is mounted above the auger 58 to promote bean movement from the hopper 24 into a metering chamber portion 86 in which the auger 58 is positioned. The metering chamber portion 86 includes a throat portion 88 of the hopper which surrounds the metering portion 52 and the stationary burr 40 attached thereto. When the stirring member 56 is rotated inside the chamber 86 it frees sticky beans which may otherwise stick to the inside of the chamber and more evenly distributes the coffee beans 26 over the metering portion 52 in the metering chamber 86 and hence, into the auger 58. The distribution of the beans 26 further facilitates and induces movement of the beans through the grinding mechanism 39.

Figure 4:
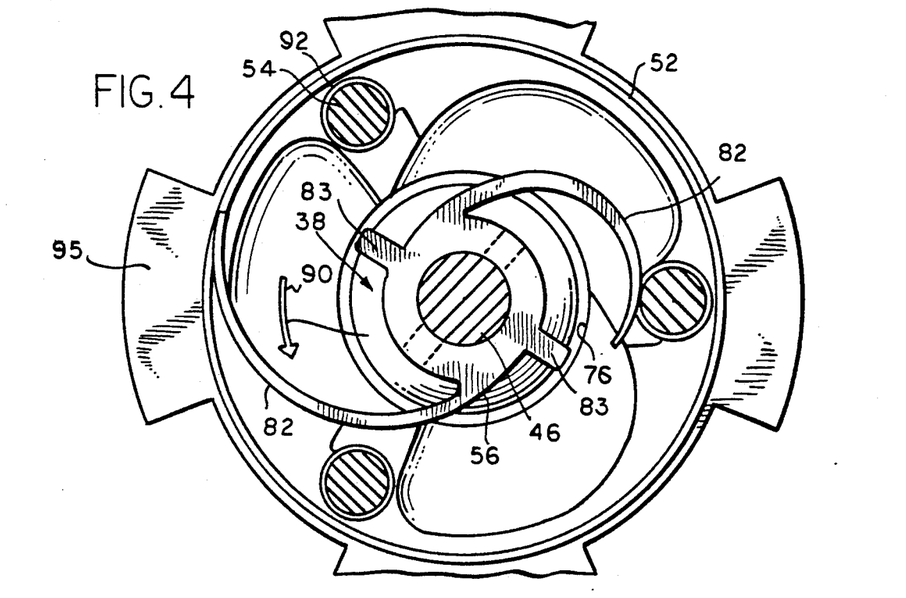
FIG. 4 is a partial fragmentary cross sectional view of the grinding apparatus taken along line 4—4 in FIG. 3.

With reference to FIG. 4, the material flow inducing means 38 are shown being rotated (as indicated by arrow 90) in a counterclockwise direction. As the stirring member 56 is rotated on the drive shaft 46, the extending arms 82 encounter mounting posts 92 through which the fasteners 54 attaching the stationary burr 40 and the metering portion 52 to the grinder assembly 28 extend. As the arms 82 contact the mounting posts 92 the arms 82 are flexed backwardly opposite the direction of rotation 90. A vibration is generated in the grinding assembly 28 when the extending arm 82 repeatedly contacts and snaps past the post 92 in the metering portion 52.

Continuous rotary movement of the material flow inducing means 38 maintains a generally continuous vibration caused by repeated impact of the extending arm 82 on the mounting posts 92 which helps induce a more fluid-flow of the beans down through the metering portion 52. The vibration set up in the metering portion 52 is sufficient to further facilitate movement of beans which have a sticky coating by overcoming the minor attractive or adhesive forces between the sticky coating of the beans.

In summary, the material flow inducing means 38 distribute and move beans 26 from the hopper 24 into the metering chamber 86 for grinding between the burrs 40,42. Beans are urged into the metering chamber 86 by the stirring member 56 and distributed over the metering portion 52 thereby. Additionally, the vibration set up by the extending arms 82 repeatedly contacting ad snapping past the mounting posts 92 generates vibrations which further facilitates a more fluid-like flow of the beans in the metering chamber 86 through the apertures 76,78. The auger 58 actively pulls beans in the metering chamber 86 down through the apertures 76,78 by means of the screw threads 74 which rotate when the drive shaft 46 is rotated during a grinding operation. Beans 26 which are pulled into and distributed in the metering chamber 86 by the material flow inducing means 38 are actively moved through the apertures 76,78 and between the stationary burr 40 and the rotary burr 42 for grinding thereby.

The ground coffee 30 which exits from between the burrs 40,42 encounters a chaff retaining plate 94 which is formed with spaced apart fins or blades 95. The blades generally do not cut the ground material, but rather limit the opening, and therefore the flow rate, of the ground material to maintain any chaff created by the grinding operation intermixed with the ground material 30. After the ground material 30 passes the chaff retaining plate 94, it is disposed in the collection receptacle 32.

As shown in FIGS. 9-13, the metering portion 52 is a generally annular ring with the aperture 76 formed concentrically therethrough. The posts 92 are generally equally spaced apart around the perimeter of the metering portion 52. Spirally downwardly inwardly sloping troughs 96 are formed in a top surface 98 of the metering portion 52. The troughs 96 have varying degrees of slope as illustrated in the cross-sections shown in FIGS. 11, 12, and 13 which promote the movement of beans though the apertures 76,78 and into the grinding mechanism 39.

Figure 10:
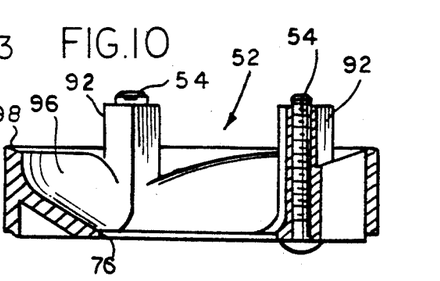
FIG. 10 is a cross sectional view of the metering member taken along line 10—10 as shown in FIG. 9.
Figure 11:
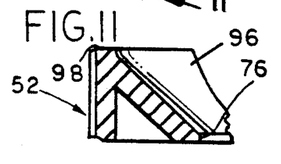
FIG. 11 is a cross sectional view of a portion of a trough of the metering member taken along line 11—11 in FIG. 9.
Figure 12:
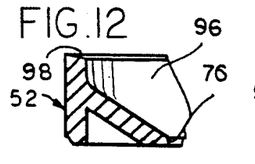
FIG. 12 is a cross sectional view of a portion of a trough of the metering member taken along line 12—12 in FIG. 9.
Figure 13:
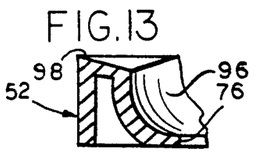
FIG. 13 is a cross sectional view of a portion of a trough of the metering member taken along line 13—13 in FIG. 9.

As shown in FIG. 10, the troughs 96 generally smoothly slope from the top surface 98 to the aperture 76. The troughs 96 cover a substantial area of the top surface 98 in order not to impede movement of beans therethrough into the grinding mechanism 39. A counterclockwise spiral orientation of the troughs 96 spaced apart generally equally around the metering portion 52 helps to facilitate movement of beans 26 therethrough when the material flow inducing means 38 is rotated in a corresponding direction.

As an additional matter, the flow inducing means 38 as shown in combination with a "burr-type" grinding mechanism may also be employed with a "blade-type" grinding mechanism. Regardless of the type of grinding mechanism employed, the material flow inducing means 38 help to actively and vibrationally move and distribute beans 26 or other material to be ground through the metering chamber 86 for grinding by the grinding mechanism.

While a preferred embodiment of the present invention is shown and described, it is envisioned that those skilled in the art may devise various modifications of the present invention without departing from the spirit and scope of the appended claims. The invention is not intended to be limited by the foregoing disclosure.

What is claimed is:

1. Material flow inducing means for use with a material grinding apparatus to grind material during a grinding operation;

the grinding apparatus includes a hopper portion for holding a quantity of material for grinding and a grinding mechanism for grinding material, drive means operatively associated with the grinding mechanism for driving the grinding mechanism to grind material during a grinding operation;

said flow inducing means comprising first means positioned between a hopper portion and a grinding mechanism for promoting movement of material from the hopper portion to the grinding mechanism and for distributing material in relation to the grinding mechanism, and second means for moving material distributed by said first means into the grinding mechanism;

wherein said first means comprises a stirring member, arms extending from said stirring member rotatably moving around an annular path during a grinding operation for moving material from the hopper portion to the grinding mechanism and distributing material in relation to the grinding mechanism;

a fixed obstruction in said annular path; and said arms being able to yield and spring back circumferentially when said arms contact said fixed obstruction for enhancing the flow of beans through the grinding mechanism.

2. Material flow inducing means according to claim 1 wherein said extending arms are curved members curving in a direction complementary to the direction of rotation of said stirring member, said arms being compressibly flexible for permitting said stirring member, to which said arms are attached, to rotate beyond said fixed obstruction in said grinding apparatus.

3. Material flow inducing means according to claim 1 wherein said second means comprises an auger positioned between said first means and the grinding mechanism and rotatably moving during a grinding operation for moving material distributed in close relation thereto by said first means into the grinding mechanism.

4. Material flow inducing means according to claim 1 wherein said second means comprises an auger positioned between said stirring member and the grinding mechanism and rotatably moving during a grinding operation for moving material into the grinding mechanism; said stirring member and said auger being operatively associated with the drive means for moving said stirring member and said auger in relation to the grinding mechanism during a grinding operation.

5. In a material grinding apparatus for grinding coffee beans including a grinding mechanism for grinding material, drive means operatively associated with said grinding mechanism for moving said grinding mechanism to cause grinding of material by said grinding mechanism, and a hopper portion for holding a quantity of material for grinding in said grinding mechanism during a grinding operation; flow inducing means comprising first means positioned between said hopper portion and said grinding mechanism for promoting movement of material from said hopper portion to said grinding mechanism and for distributing material in relation to said grinding mechanism, second means for moving material into said grinding mechanism, said first means comprising a stirring member, arms extending from said stirring member rotatably moving during a grinding operation for moving material from the hopper portion to the grinding mechanism and distributing material in relation to the grinding mechanism, and said arms being able to yield and spring back circumferentially in response to variable resistance encountered during rotation for enhancing the flow of material through the grinding mechanism.

6. A grinding apparatus according to claim 5 wherein said grinding mechanism includes a first and a second grinding burr, opposed faces of said first and second grinding burrs having grinding surfaces for grinding material therebetween, a space defined between said faces of said first and second grinding burrs, an aperture formed through said first burr for receiving material therethrough, said first means being positioned above said first burr for distributing material thereover, said second means being positioned at least partially extending through said aperture for moving material distributed by said first means into said space between said faces of said first and second burrs.

7. A grinding apparatus according to claim 5 wherein said arms curve in a direction complementary to the direction of rotation of said stirring member, said arms being compressibly flexible for permitting said stirring member, to which said arms are attached, to rotate beyond fixed obstructions.

8. A grinding apparatus according to claim 5 wherein said second means comprises an auger positioned between said stirring member and said grinding mechanism and rotatably moving during a grinding operation for moving material into said grinding mechanism; said drive means being operatively associated with said stirring member and said auger, said drive means operatively moving said stirring member and said auger when said drive means operates said grinding mechanism during a grinding operation.

9. A grinding apparatus according to claim 8 wherein a keyway portion is formed in said auger, a mating key portion formed on said stirring member, said mating key portion being matably engageable in said keyway portion for synchronously driving said stirring member and said auger during a grinding operation.

10. A grinding apparatus according to claim 8 wherein said auger and said stirring member are formed of Nylon 66.

11. A grinding apparatus according to claim 8 wherein said auger and said stirring member are integrally formed as a single piece body.

12. A grinding apparatus for grinding coffee beans, said improvement comprising flow inducing means and a material metering portion;

said grinding apparatus including a grinding mechanism for grinding material, drive means operatively associated with said grinding mechanism for driving said grinding mechanism during a grinding operation, a hopper portion for holding a quantity of material for grinding in said grinding mechanism during a grinding operation, and a collection container in communication with said grinding mechanism for containing ground material produced by said grinding mechanism during a grinding operation;

said flow inducing means comprising first means positioned between said hopper portion and said grinding mechanism for promoting movement of material from said hopper portion to said grinding mechanism and distributing material in relation to said grinding mechanism, and second means for moving material into said grinding mechanism;

said material metering portion positioned in a surrounding relation to said second means, multiple downwardly spiralling inwardly sloping troughs in a top surface of said material metering portion for receiving material distributed in relation thereto by said first means and facilitating movement of said material into said grinding mechanism, at least one aperture associated with a lowest portion of said troughs extending through said metering portion through which material is moved by said second means into said grinding mechanism.

13. A grinding apparatus according to claim 12 wherein said grinding mechanism includes a first and a second grinding burr, opposed faces of said first and second grinding burrs having grinding surfaces for grinding material therebetween, a space defined between said faces of said first and second burrs, a hole formed through said first burr for receiving material therethrough, said at least one aperture extending through said metering portion generally coaxial with said hole, said first means being positioned above said metering portion for distributing material thereover, said second means at least extending into said aperture for moving material from said metering portion into said space between said faces of said first and second burrs.

14. A grinding apparatus according to claim 12 wherein said metering portion is fixedly positioned in said grinding apparatus relative to and independent from said first and second means, a chamber having a bottom defined by said metering portion and walls extending generally upwardly away from said metering portion, a portion of said chamber spaced apart from said metering portion communicating with said hopper portion, attachment members attaching said metering portion in a fixed relation to said grinding apparatus extending along an inside surface of said walls of said chamber;

said first means comprising a stirring member having arms extending therefrom and curving in a direction complementary to a direction of rotation of said stirring member, said arms being compressibly flexible, said stirring member rotating during a grinding operation for moving material from said hopper portion to said chamber for delivery to said grinding mechanism, a first radius of said chamber substantially equalling an arm diameter measured across said extending arms in an uncompressed state, a reduced diameter of said chamber measured across said chamber at at least one of said attachment members being smaller than said arm diameter;

said arms being inwardly compressibly flexed when contacting said attachment members and snapping outwardly towards said walls of said chamber after passing said attachment member when said stirring member is rotated within said chamber during a grinding operation, flexibly compressing and outwardly snapping said arms upon rotating said stirring member for creating vibrations in said chamber and said metering portion to promote fluid-like movement of said material in said chamber down said troughs and for preventing material from accumulating inside of said chamber.

15. Material flow inducing means for use with a material grinding apparatus to grind material during a grinding operation;

the grinding apparatus includes a hopper portion for holding a quantity of material for grinding and a grinding mechanism for grinding material, drive means operatively associated with the grinding mechanism for driving the grinding mechanism to grind material during a grinding operation;

said flow inducing means comprising first means positioned between the hopper portion and the grinding mechanism for promoting movement of material from the hopper portion to the grinding mechanism and for distributing material in relation to the grinding mechanism, and second means for moving material distributed by said first means into the grinding mechanism;

said first means comprising a stirring member, arms extending from said stirring member rotatably moving during a grinding operation for moving material from the hopper portion to the grinding mechanism and distributing material in relation to the grinding mechanism; and said extending arms being curved members curving in a direction complementary to the direction of rotation of said stirring member, said arms being compressibly flexible for permitting said stirring member, to which said arms are attached, to rotate beyond fixed obstruction in the grinding apparatus.

16. In a material grinding apparatus for grinding coffee beans including a grinding mechanism for grinding material, drive means operatively associated with said grinding mechanism for moving said grinding mechanism to cause grinding of material by said grinding mechanism, and a hopper portion for holding a quantity of material for grinding in said grinding mechanism during a grinding operation; flow inducing means comprising first means positioned between said hopper portion and said grinding mechanism for promoting movement of material from said hopper portion to said grinding mechanism and for distributing material in relation to said grinding mechanism, and second means for moving material into said grinding mechanism, said first means comprising a stirring member, arms extending from said stirring member rotatably moving during a grinding operation for moving material from said hopper portion to said grinding mechanism and distributing said material in relation to said grinding mechanism, said arms curving in a direction complementary to the direction of rotation of said stirring member, said arms being compressibly flexible for permitting said stirring member, to which said arms are attached, to rotate beyond fixed obstruction.

17. A grinding apparatus for grinding coffee beans said improvement comprising flow inducing means and a material metering portion;

said grinding apparatus including a grinding mechanism for grinding material, drive means operatively associated with said grinding mechanism for driving said grinding mechanism during a grinding operation, a hopper portion for holding a quantity of material for grinding in said grinding mechanism during a grinding operation, and a collection container in communication with said grinding mechanism for containing ground material produced by said grinding mechanism during a grinding operation;

said flow inducing means comprising first means positioned between said hopper portion and said grinding mechanism for promoting movement of material from said hopper portion to said grinding mechanism and distributing material in relation to said grinding mechanism, and second means for moving material into said grinding mechanism;

said material metering portion positioned in a surrounding relation to said second means, multiple downwardly spiralling inwardly sloping troughs in a top surface of said material metering portion for receiving material distributed in relation thereto by said first means and facilitating movement of said material into said grinding mechanism, at least one aperture associated with a lowest portion of said troughs extending through said metering portion through which material is moved by said second means into said grinding mechanism.

said metering portion being fixedly positioned in said grinding apparatus relative to and independent from said first and second means, a chamber having a bottom defined by said metering portion and walls extending generally upwardly away form said metering portion, a portion of said chamber spaced apart from said metering portion communicating with said hopper portion, attachment members attaching said metering portion in a fixed relation to said grinding apparatus extending along an inside surface of said walls of said chamber;

said first means comprising a stirring member having arms extending therefrom and curving in a direction complementary to a direction of rotation of said stirring member, said arms being compressibly flexible, said stirring member rotating during a grinding operation for moving material from said hopper portion to said chamber for delivery to said grinding mechanism, a first radius of said chamber substantially equalling an arm diameter measured across said extending arms in an uncompressed state, a reduced diameter of said chamber measured across said chamber at at least one of said attachment members being smaller than said arm diameter;

said arms being inwardly compressibly flexed when contacting said attachment members and snapping outwardly towards said walls of said chamber after passing said attachment members when said stirring member is rotated within said chamber during a grinding operation, flexibly compressing and outwardly snapping said arms upon rotating said stirring member for creating vibrations in said chamber and said metering portion to promote fluid-like movement of said material in said chamber down said troughs and for preventing material from accumulating inside of said chamber.

* * * * *

UNITED STATES PATENT AND TRADEMARK OFFICE
CERTIFICATE OF CORRECTION

PATENT NO. : 5,172,868
DATED : December 22, 1992
INVENTOR(S) : William E. Midden It is certified that error appears in the above-identified patent and that said Letters Patent is hereby corrected as shown below:

Column 10, Line 50 "away form" should read -- away from --

Signed and Sealed this

Thirtieth Day of November, 1993

Attest:

BRUCE LEHMAN

*Attesting Officer*     *Commissioner of Patents and Trademarks*